United States Patent Office 3,547,863
Patented Dec. 15, 1970

3,547,863
ANTISTATIC AGENTS FOR HIGH-POLYMERIC COMPOUNDS
Franz Landauer and Hans-Joachim Vetter, Frankfurt am Main, Germany, assignors, by mesne assignments, to Hercules Incorporated, Wilmington, Del.
No Drawing. Filed Jan. 23, 1967, Ser. No. 610,822
Claims priority, application Germany, Jan. 28, 1966,
F 48,284
Int. Cl. C08f 3/04, 7/04
U.S. Cl. 260—93.5
5 Claims

ABSTRACT OF THE DISCLOSURE

Antistatic substances as additives to high-polymeric compounds prepared from oxazolines by reaction with alkylene oxide.

---

The present invention relates to antistatic agents for high-polymeric compounds.

In the manufacture and work-up of high polymeric compounds which, as is known, are good insulating materials, and also when using the articles made thereof, electrostatic charging occurs which frequently causes disturbances. This electrostatic charging does not only result in the articles adhering to each other or repelling each other, but also in their attracting dust- and dirt particles. There have already been recommended different ionic or non-ionic antistatic agents, such as quaternary ammonium salts, as well as amines and amides as such or those which have been alkylene-oxylated, furthermore amino alcohols and the esters thereof, conversion products of fatty acids or high molecular weight alcohols with alkylene oxide, siloxanes, organyl-sulfonates and derivatives of phosphoric acid, which are added to the high-polymeric compound prior to the work-up or which are applied to the shaped articles in the form of an aqueous or organic solution. However, the anti-static efficacy or the other properties are generally not satisfactory, such as poor compatibility with the high-polymer as such or with other auxiliary agents, as well as self-odor, decomposition, i.e. discoloration on being worked up, liability of the antistatic layer of being easily washed off with water, a low light resistance and exudation. In many cases it is also necessary to subject the shaped articles to a flame treatment or to a high-frequency discharge in order to render the antistatic effect effective. In some cases this effect develops only after a prolonged period, for example after several weeks, so that the material may become soiled or may attract dust already previously.

It is, above all, a disadvantage for the applicability of polyethylene glycol or ethoxylated fatty acids, alcohols or amines as antistatic agents that they have a relatively high tendency of exuding from high-polymeric organic compounds, which results in smeared surfaces which can be printed with difficulty only. With the use of ethoxylated alcohols or amines, moreover, a disagreeable odor becomes noticeable, said alcohols or amines bringing about a discoloration, for example, in polyethylene and polypropylene. In spite of a satisfactory antistatic efficacy, these properties very much limit the range of application of the antistatic agents.

Now we have found that high-polymeric compounds can advantageously be rendered resistant to electrostatic charge by using conversion products of oxazolines of the formula

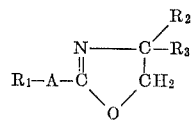

in which $R_1$ represents an alkyl-, aryl- or cycloalkyl radical containing 3 to 20 carbon atoms, A being $CH_2$, $O-CH_2$ or $S-CH_2$, $R_2$ represents an alkyl radical containing 1 to 4 carbon atoms or the radical $$-(CH_2)_y-O-H$$

$y$ being a whole number from 1 to 3, and $R_3$ represents the radical $-(CH_2)_y-O-H$, with 3 to 100 moles alkylene oxide, preferably ethylene oxide and/or propylene oxide, especially 5 to 60 moles ethylene oxide per mole of oxazoline, in an amount within the range of from 0.05 to 4 percent by weight, preferably 0.5 to 1.5 percent by weight, calculated on the high-polymeric compound.

As substituted oxazolines there may be used, for example, the addition products of alkylene oxides, especially of ethylene oxide and/or propylene oxide, and 2-hexyl-4-methyl-4-hydroxymethyl-oxazoline,
2-α-ethylpentyl-4-ethyl-4-hydroxymethyl-oxazoline,
2-undecyl-4,4-bis-hydroxymethyl-oxazoline,
2-heptadecyl-4-hydroxymethyl-oxazoline,
2-heptoxy-methylene-4-ethyl-4-hydroxymethyl-oxazoline,
2-phenyl-4-ethyl-4-hydroxymethyl-oxazoline.

The oxazolines can be prepared according to known processes, for example according to U.S. Pat. 2,504,951, from aromatic carboxylic acids or from saturated or unsaturated aliphatic or cycloaliphatic monocarboxylic acids, which may be linear or branched, or from mixtures of these carboxylic acids such, for example, as stearic acid or coconut oil acid, by reaction with alkylol amines (1,2), carrying at least two hydroxyl groups, such, for example, as 2-amino-2-ethyl-propanediol-(1,3), 2-amino-2-methyl-propanediol-(1,3) or trishydroxymethyl-amino-methane with the splitting off of two moles water at an elevated temperature and, if desired, under reduced pressure. The hydroxyl groups of the substituted oxazolines obtained in this manner can then be converted according to the usual processes, for example according to the process known from German Auselgeschrift 1,027,672, with epoxides such as, for example, ethylene oxide or propylene oxide or mixtures of these epoxides.

Depending on the ramification and the number of the carbon atoms of the hydrocarbon radical $R_1$ at the oxazolines nucleus in combination with the amount of ethylene oxide and/or propylene oxide, there are obtained products having a more or less pronounced hydrophilic or hydrophobic character, for which reason the substances may not only be incorporated as water-insoluble antistatic agents to the high polymeric compound but may also be used in the form of an aqueous or organic solution, for example in chlorohydrocarbons, such as carbon tetrachloride, esters, such as ethyl acetate, ketones, such as acetone, or aromatic hydrocarbons, such as benzene, for the treatment of finished shaped articles.

The antistatic agents used according to the present invention improve the blocking resistance of the plastic materials during the work-up and diminish blocking, that is to say, sticking of the finished articles, but above all, they diminish electrostatic charging. Even when being used in small amounts, the antistatic agents described above exhibit a high permanent efficacy; they withstand the high temperatures applied during the work-up and do not produce discolorations. Moreover, they are well compatible with the plastic material. Exudation does not occur if the concentration is not too high.

All high-polymeric organic compounds can be rendered resistant to electrostatic charging in accordance with the process of the present invention, polyolefins and polyesters being especially suitable. As polyolefins there may be used, for example, homopolymers of ethylene, propylene, 4-methyl-pentene-1, styrene and isoprene, furthermore copolymers of ethylene and propylene, 4- methylpentene-1 and 1-olefines, furthermore copolymers of styrene and acrylonitrile, methacrylonitrile or diolefins, such as butadiene-1,3. By polyesters there are understood, for example, polymeric esters of terephthalic acid and glycols having 2 to 10 carbon atoms.

The antistatic agent can be incorporated to the high-polymeric compound by admixture in the dry state, by rolling or granulation, or in a Banbury mixer (R). The antistatic additive may be applied in the form of a solution in a solvent that swells the high-polymeric compound or no, or it may be applied in the form of a suspension or a dispersion, the liquid medium being evaporated after the treatment of the powder, granular product or finished shaped article.

Other conventional additives, such as stabilizers, fillers, dyestuffs, lubricants, plasticizers or pigments are not prejudicial to the antistatic effcacy. In many cases it is advantageous to apply several of the antistatic agents used according to the present invention together or to apply the oxalkylated oxazolines together with other antistatic agents.

The antistatic masses obtained can be worked up by the convention methods, for example by injection-molding, extrusion-molding or deep drawing.

The following examples serve to illustrate the invention, but they are not intended to limit it thereto, the percentages being by weight:

Examples 1 to 24

The antistatic agents listed in the table were dissolved and mixed with the pulverulent plastic material in an impelled. The solvent was quantitatively evaporated in vacuo at elevated temperatures. From the mixtures so obtained 1 mm. thick pressed sheets were made between chrome plated brass plates.

To examine the antistatic efficacy, tribo-electric voltages produced on test sheets were compared with each other. To this effect, electrostatic charges were produced on a sample (7 x 7 cm. x 1 mm.) oscillating in a horizontal direction, by means of a cylinder covered with a woolen cloth and rotating at a constant speed. The electrostatic maximum charge produced by repeated friction was determined by an electro-statometer which was fixed at a distance of 6 cm. from the test sheet (indicated in the table by V). $V_1$ means measurement directly after the preparation of the test body, $V_2$ means measurement after the test body has been wiped off with a wet cloth and allowed to dry for a period of 5 hours.

To examine the antistatic efficacy there was, furthermore, carried out the following carbon black test: The test sheet was moved to and fro under slight pressure on a standard cloth (wool) having the dimensions 10 x 30 cm. and held above a layer of carbon black at a distance of 0.5 cm.

+ means attraction of carbon black
− means no attraction of carbon black

All measurements were carried out at a temperature of 20° C. and at a relative atmospheric moisture of 50 percent (atmospheric standard conditions).

In the examples the antistatic agents were used in a 1 percent concentration. The processing temperatures (molding press) were 160° C. for polyethylene, 200° C. for polypropylene, 150° C. for polystyrene and 270° C. for poly(ethylene-terephthalate). The values combined in the table following hereunder show the electrostatic behaviour of the high-polymeric compounds rendered resistant to electrostatic charge by means of the antistatic agents applied according to the present invention.

After storing the test bodies at elevated temperatures, and then cooling them to −40° C., exudation was not observed. Even when heating the masses applied according to the present invention intensively in the cylinder of an injection molding machine for a prolonged period, discolorations did not occur.

TABLE

| Example No. | Polymer | Additive | Surface voltage $V_1$ | Surface voltage $V_2$[1] | Carbon black test |
|---|---|---|---|---|---|
| 1 | PP[2] | No additive | −2790 | −2910 | + |
| 2 | PP | 2-heptadecyl-4-ethyl-4-hydroxymethyloxazoline.40 EO[3] | −110 | +100 | − |
| 3 | PP | 2-α-ethylpentyl-4-ethyl-4-hydroxymethyloxazoline.40 EO. | −37 | −370 | − |
| 4 | PP | 2-naphtenyl-4-ethyl-4-hydroxymethyloxazoline.30 EO | +100 | −290 | − |
| 5 | PP | 2-undecyl-4-ethyl-4-hydroxymethyloxazoline.5 EO | −18 | −405 | − |
| 6 | PP | 2-heptadecyl-4-ethyl-4-hydroxymethyloxazoline.3 PrO.20 EO.[3] | −65 | −350 | − |
| 7 | PE[4] | No additive | −2,700 | −2,805 | + |
| 8 | PE | 2-heptadecyl-4-ethyl-4-hydroxymethyloxazoline.40 EO | −70 | −400 | − |
| 9 | PE | 2-heptadecyl-4-ethyl-4-hydroxymethyloxazoline.5 EO | −100 | −450 | − |
| 10 | PE | 2-undecyl-4-ethyl-4-hydroxymethyloxazoline.5 EO | −18 | −380 | − |
| 11 | PE | 2-undecyl-4,4-bis-hydroxymethyloxazoline.30 EO | −200 | −500 | − |
| 12 | PE | 2-naphtenyl-4-ethyl-4-hydroxymethyloxazoline.30 EO | −160 | −430 | − |
| 13 | PE | 2-heptoxymethylene-4-ethyl-4-hydroxymethyloxazoline-.20 EO. | −90 | −370 | − |
| 14 | PE | 2-dodecyl-mercaptomethylene-4-methyl-4-hydroxy-methyloxazoline.10 EO. | −145 | −490 | − |
| 15 | PS[5] | No additive | −3,100 | | + |
| 16 | PS | 2-undecyl-4-ethyl-4-hydroxymethyloxazoline.30 EO | +10 | −60 | − |
| 17 | PS | 2-undecyl-4-ethyl-4-hydroxymethyloxazoline.100 EO | −310 | −222 | − |
| 18 | PS | 2-α-ethylpentyl-4-ethyl-4-hydroxymethyloxazoline.40 EO. | +260 | +148 | − |
| 19 | PS | 2-heptadecyl-4-ethyl-4-hydroxymethyloxazoline.5 EO | +185 | −225 | − |
| 20 | PETP[6] | No additive | −2,200 | | + |
| 21 | PETP | 2-α-ethylpentyl-4-ethyl-4-hydroxymethyloxazoline.30 EO. | +60 | −70 | − |
| 22 | PETP | 2-heptadecyl-4-ethyl-4-hydroxymethyloxazoline.5 EO | −55 | −110 | − |
| 23 | PETP | 2-naphtenyl-4-ethyl-4-hydroxymethyloxazoline.40 EO | −90 | −148 | − |
| 24 | PETP | 2-octyl-4-ethyl-4-hydroxymethyloxazoline.40 EO | +150 | −95 | − |

[1] Wiped off with a wet cloth.
[2] PP=polypropylene.
[3] EO=ethylene oxide, PrO=propylene oxide.
[4] PE=linear (low-pressure) polyethylene.
[5] PS=polystyrene.
[6] PETP=polyethylene terephthalate.

We claim:
1. A composition resistant to electrostatic charge consisting essentially of a polymer selected from the group consisting of homopolymers of α-mono-olefins, an ethylene-propylene copolymer, polystyrene, a styrene-acrylonitrile copolymer, a styrene-methacrylonitrile copolymer, a butadiene-styrene copolymer and polyisoprene and from 0.05 to 4 percent by weight based on said polymer of, as an antistatic agent, an addition product prepared by reacting an oxazoline of the formula:

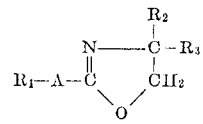

wherein $R_1$ stands for alkyl, aryl or cycloalkyl containing 3 to 20 carbon atoms, A stands for $CH_2$, $O-CH_2$ or $S-CH_2$, $R_2$ stands for alkyl having 1 to 4 carbon atoms or $-(CH_2)y-O-H$ wherein $y$ is a whole number from 1 to 3, and $R_3$ stands for $-(CH_2)y-O-H$ wherein $y$ is a whole number from 1 to 3, with 3 to 100 moles of ethylene oxide, propylene oxide or mixtures thereof per mole of oxazoline, said addition of said oxide taking place by reaction of the oxide with a free hydroxyl group on the oxazoline.

2. The composition according to claim 1 wherein the antistatic agent is present in an amount between 0.5 to 1.5 percent.

3. The composition according to claim 1 wherein the oxazoline is 2-hexyl-4-methyl-4-hydroxymethyl - oxazoline, 2α - ethylpentyl-4-ethyl-4-hydroxymethyl - oxazoline, 2-undecyl-4,4-bis-hydroxymethyl-oxazoline, 2-heptadecyl-4-hydroxymethyl-oxazoline, 2-heptoxy-methylene-4-ethyl-4-hydroxymethyl-oxazoline or 2-phenyl-4 - ethyl - 4 - hydroxymethyl-oxazoline.

4. The composition according to claim 1 wherein the polymer is polyethylene or polypropylene.

5. The composition according to claim 1 wherein the polymer is polystyrene.

References Cited

UNITED STATES PATENTS

| | | | |
|---|---|---|---|
| 2,636,038 | 4/1953 | Brandner | 260—307.6 |
| 3,110,732 | 11/1963 | Speranza et al. | 260—307.6 |
| 2,965,678 | 12/1960 | Sundberg et al. | 260—615 |
| 3,190,763 | 6/1965 | Schleede et al. | 106—186 |

FOREIGN PATENTS

| | | | |
|---|---|---|---|
| 1,006,115 | 4/1957 | Germany | 260—Anti Static |
| 1,323,473 | 2/1963 | France | 260—307.6 |

JAMES A. SEIDLECK, Primary Examiner

U.S. Cl. X.R.

260—75, 85.1, 85.5, 88.2, 94.7